United States Patent
Hirano (10) Patent No.: US 8,024,990 B2
(45) Date of Patent: Sep. 27, 2011

(54) SHIFT LEVER APPARATUS

(75) Inventor: Morimichi Hirano, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 944 days.

(21) Appl. No.: 11/858,021

(22) Filed: Sep. 19, 2007

(65) Prior Publication Data

US 2008/0072698 A1 Mar. 27, 2008

(30) Foreign Application Priority Data

Sep. 25, 2006 (JP) ................. 2006-259676

(51) Int. Cl.
*F16H 59/10* (2006.01)
*B60K 20/02* (2006.01)

(52) U.S. Cl. ............... 74/473.18; 74/473.27; 74/473.28; 74/473.33

(58) Field of Classification Search ............... 74/473.18, 74/473.27, 473.28, 473.33
See application file for complete search history.

(56) References Cited

U.S. PATENT DOCUMENTS

| | | | | |
|---|---|---|---|---|
| 5,309,784 A * | 5/1994 | Kobayashi et al. | ........ | 74/473.33 |
| 5,339,705 A * | 8/1994 | Shirahama et al. | ........ | 74/473.27 |
| 7,363,836 B2 * | 4/2008 | Koide | ........ | 74/473.33 |
| 2006/0185467 A1 * | 8/2006 | Giefer et al. | ........ | 74/532 |

FOREIGN PATENT DOCUMENTS

| | | |
|---|---|---|
| JP | 09-263153 | 7/1997 |
| JP | 2000-168388 A | 6/2000 |
| JP | 2002-87100 * | 3/2002 |
| JP | 2006-168599 | 6/2006 |

OTHER PUBLICATIONS

Japanese Office Action dated Nov. 2, 2010, JP 2006-259676 (translation attached).

* cited by examiner

*Primary Examiner* — William C Joyce
(74) *Attorney, Agent, or Firm* — Roberts Mlotkowski Safran & Cole, P.C.

(57) ABSTRACT

A shift lever apparatus includes a detent pin, and the distal end portion thereof is attached to a shift lever so as to be movable in the direction of coming into and out of contact with the shift lever. A lever guide is formed with a transition sliding surface on which the distal end of the detent pin slides along the operation of the shift lever on the back surface thereof. A gate portion is provided on the transition sliding surface, and limits the direction of movement of the detent pin in the direction practically matching the selecting direction by coming into contact with the distal end portion of the sliding detent pin. Accordingly, the direction of movement of the shift lever is limited only to the direction practically matching the selecting direction by a force transmitted from the gate portion via the detent pin when the shift lever passes through a transition guide groove.

12 Claims, 9 Drawing Sheets

SELECTING DIRECTION

SHIFT LEVER APPARATUS

CROSS-REFERENCE TO RELATED APPLICATION

This application claims priority under 35 USC 119 from Japanese Patent Application No. 2006-259676, the disclosure of which is incorporated by reference herein.

BACKGROUND OF THE INVENTION

1. Field of the Invention

The present invention relates to a shift lever apparatus of a motor vehicle and, more specifically, to a shift lever apparatus for changing gear in a transmission.

2. Description of the Related Art

A shift lever apparatus for changing gear in an automatic transmission of a motor vehicle disclosed in JP-A No. 2000-168388 is known. With the shift lever apparatus as disclosed in JP-A No. 2000-168388, it is difficult for a driver to transmit an operating force in only one of the widthwise direction and the front and rear direction in terms of the vehicle to a shift lever when changing the gear, and the shift lever is adapted to be capable of moving between shift positions even when the shift lever is operated in an oblique direction which is slightly inclined with respect to the widthwise and the front and rear directions of the vehicle. Therefore, for example, when attempt is made to shift the shift lever from the parking position (position P) to the drive position (position D) in an automatic transmission area, the shift lever may pass over the position D unintentionally and be shifted to shift positions in a manual transmission area (position − or position +).

In order to avoid the erroneous operation as described above, the shift lever apparatus disclosed in JP-A No. 2000-168388 is configured in such a manner that a first front and rear transfer channel linearly connecting the position R and a midpoint between the position R and the position N and a connection transfer channel linearly connecting the midpoint and the position N in the automatic transmission area are connected at an acute angle. Accordingly, the possibility that the shift lever passes over a second front and rear transfer channel linearly connecting the position N and the position D when an attempt is made to shift the shift lever from the position P to the position D or when an attempt is made to shift the shift lever to a shift waiting position to the position N is reduced, so that the erroneous operation as described above is effectively prevented.

However, with the shift lever apparatus disclosed in JP-A No. 2000-168388, a driver must shift the shift lever consciously in the direction inclined with respect to the widthwise direction of the vehicle in the automatic transmission area. Therefore, the driver may have an uncomfortable feeling and hence the shift feeling is deteriorated when operating the shift lever until he or she gets used to the operation in the oblique direction.

SUMMARY OF THE INVENTION

In view of such circumstances described above, it is an object of the invention to provide a shift lever apparatus in which erroneous entry of a shift lever into a second guide groove is effectively prevented even when the shift lever is shifted in the oblique direction in a first guide groove and, in addition, deterioration of shift feeling is avoided.

A shift lever apparatus according to a first aspect of the invention in order to solve the above described problem includes: a shift lever movable along a first operating direction and a second operating direction substantially orthogonal to each other; a lever guide having a first guide groove extending in a zigzag pattern (e.g., stepped shape) along the first operating direction or the second operating direction, a second guide groove extending along the first operating direction, and a transition guide groove extending in the second operating direction and connecting the first guide groove and the second guide groove, the lever guide holding the shift lever within any one of the first guide groove, the second guide groove and the transition guide groove and guiding the shift lever along the first guide groove, the second guide groove and the transition guide groove; a detent pin supported by the shift lever such that the distal end thereof is movable along the direction of coming into and out of contact with the shift lever and such that the detent pin is moved along the first operating direction and the second operating direction integrally with the shift lever; an urging member for urging the detent pin away from the shift lever; a first sliding surface for generating a holding force for holding the shift lever at a predetermined shift position in the first guide groove by coming into press contact with the distal end portion of the detent pin when the shift lever is held in the first guide groove; a second sliding surface for generating a holding force for holing the shift lever at a predetermined shift waiting position in the second guide groove by coming into press contact with the distal end portion of the detent pin when the shift lever is held in the second guide groove; a transition sliding surface for generating an urging force for providing a tactile feedback to the shift lever by coming into press contact with the distal end portion of the detent pin when the shift lever passes through the transition guide groove; and a pair of gate portions formed on the transition sliding surface and limiting the direction of movement of the detent pin to a direction substantially matching the second operating direction by coming into contact with the detent pin moving on the transition sliding surface.

In the shift lever apparatus according to the first aspect of the invention, the pair of gate portions formed on the transition sliding surface come into contact with the detent pin moving on the transition sliding surface and limit the direction of movement of the detent pin to the direction substantially matching the second operating direction. Even though an operating force containing a component inclined with respect to the second operating direction (load component) is applied to the shift lever when the shift lever moving in the first and second operating directions integrally with the detent pin passes through the transition guide groove, passage of the shift lever is blocked by a reaction force transmitted from the pair of gate portions via the detent pin, and the direction of movement of the shift lever is limited only to the direction substantially matching the second operating direction.

Consequently, according to the shift lever apparatus in the first aspect of the invention, passage of the shift lever to which the operating force including the load component in the oblique direction with respect to the second operating direction is transmitted in the transition guide groove is blocked, and smooth passage in the transition guide groove is allowed only for the shift lever to which the operating force including the load component substantially parallel to the second operating direction is transmitted. Consequently, even when the shift lever is shifted in the oblique direction in the first guide groove extending in the zigzag pattern, erroneous entry of the shift lever from the first guide groove to the second guide groove through the transition guide groove is effectively prevented.

Preferably, the pair of gate portions may limit an area where the detent pin can pass through along the first operating direction (the width along the first operating direction) to a gate area having a predetermined width narrower than the width of the transition sliding surface.

In this configuration, since the pair of gate portions limit the area where the detent pin can pass through along the first operating direction to the gate area having the predetermined width narrower than the width of the transition sliding surface, the area where the shift lever can pass through in the shifting direction in the transition guide groove is also limited to an area corresponding to the gate area. Therefore, the detent pin is caught by one or the other one of the pair of gate portions unless the shift lever in the first guide groove is positioned (stopped) at a predetermined position corresponding to the gate area along the shifting direction, and then the shift lever is entered into the transition guide groove, so that the smooth passage of the shift lever in the transition guide groove is hindered.

Consequently, according to the shift lever apparatus in this configuration, the movement of the shift lever toward the second guide groove is blocked by the pair of gate portions, unless the shift lever is positioned once at the position which corresponds to the gate area in the first guide groove, and then the shift lever is shifted toward the second guide groove along the direction practically matching the selecting direction, so that erroneous entry of the shift lever into the second guide groove through the transition guide groove is reliably prevented when the shift lever is shifted in the oblique direction in the first guide groove.

The pair of gate portions may be formed so as to project from the transition sliding surface, and may be arranged along the first operating direction.

The shift lever in the first guide groove may be movable to a given shift position in an automatic transmission mode selecting area.

The shift lever in the second guide groove may be movable from the shift waiting position to the shift-up position and the shift-down position in a manual transmission mode selecting area.

As described above, according to the shift lever apparatus according to the invention, even though the shift lever is shifted in the oblique direction in the first guide groove, erroneous entry of the shift lever into the second guide groove is effectively prevented and, in addition, deterioration of the shift feeling is avoided.

DETAILED DESCRIPTION OF THE INVENTION

Referring now to the drawings, a shift lever apparatus according to an embodiment of the invention will be described. The terms indicating directions such as front, rear, top, bottom, front and rear, and width in this specification indicate the directions on the basis of the vehicle unless otherwise specifically noted.

Configuration of Embodiment

Figure 1:
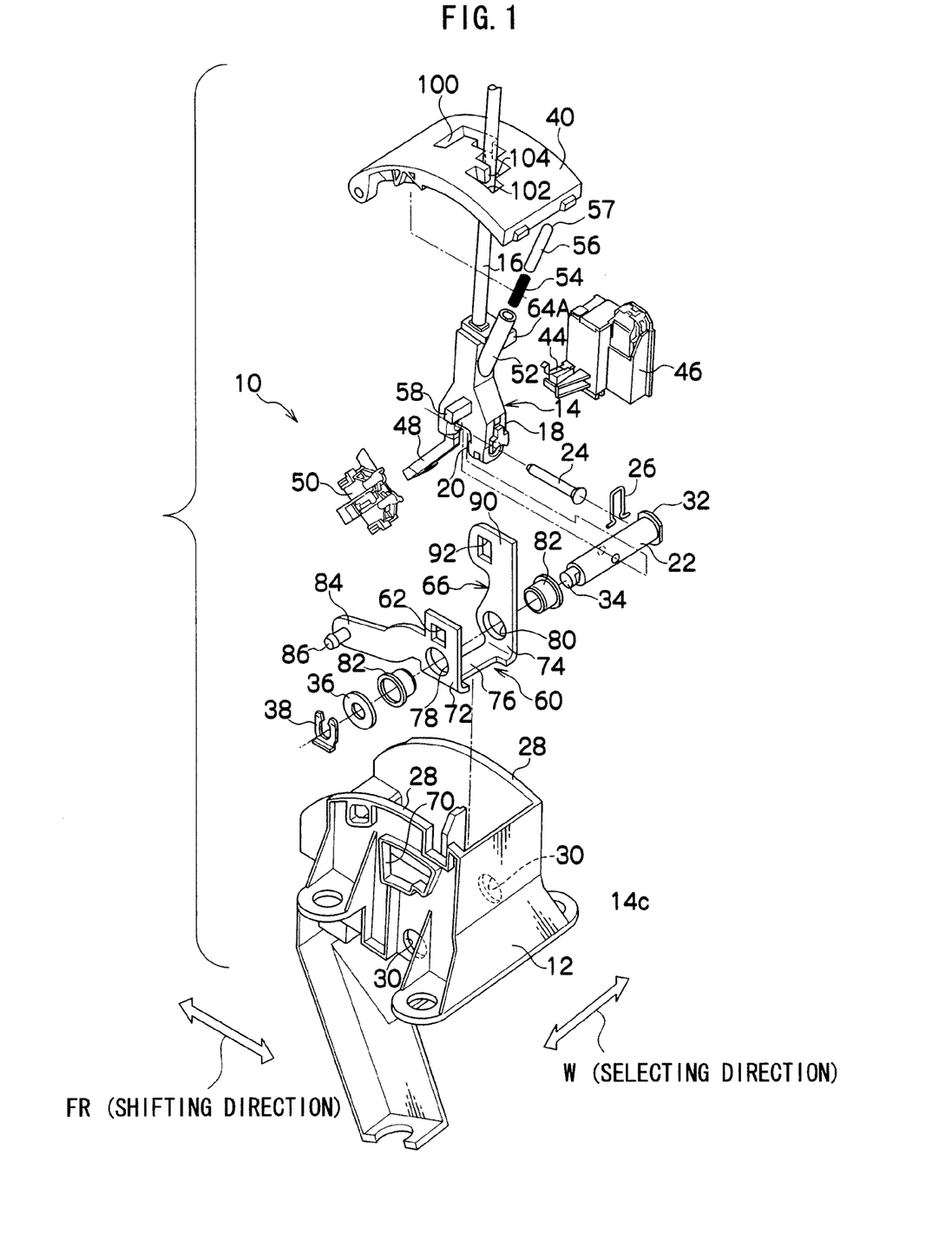
FIG. 1 is an exploded perspective view showing an entire configuration of a shift lever apparatus according to an embodiment of the invention.
Figure 2:
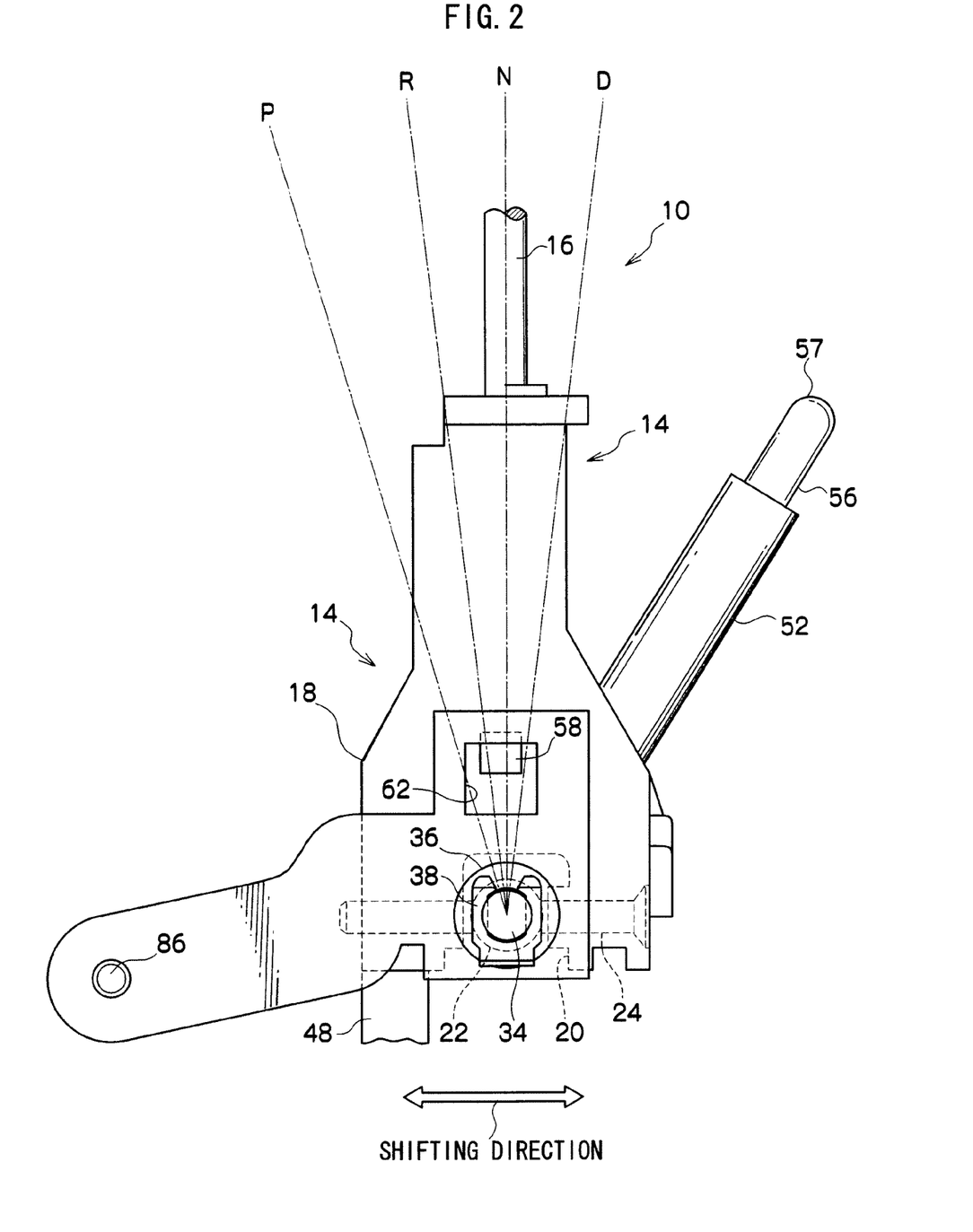
FIG. 2 is a side view of a shift lever and a control lever shown in FIG. 1 viewed from the outside in the widthwise direction of a vehicle.
Figure 3:
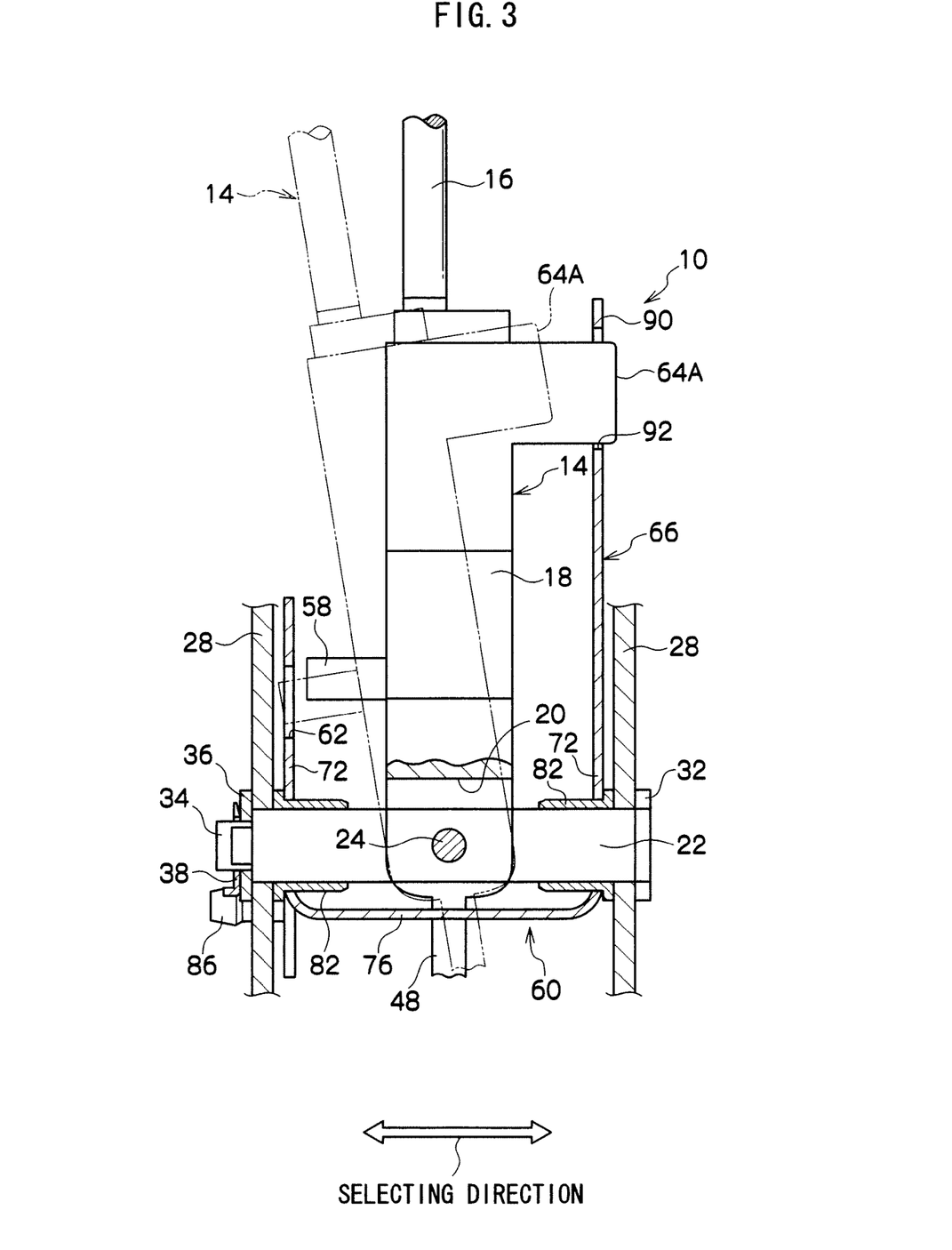
FIG. 3 is a front view of the shift lever and the control lever shown in FIG. 1 viewed from the front side of the vehicle.

FIG. 1 shows an entire configuration of a shift lever apparatus 10 according to the embodiment of the invention. FIG. 2 shows a configuration of a principal portion of the shift lever apparatus 10 when viewed from the widthwise outside, and FIG. 3 shows a configuration of the principal portion of the shift lever apparatus 10 when viewed from the rear. The shift lever apparatus 10 is configured as a gate-type shift lever apparatus in which so-called manual transmission is possible, and the transmission mode may be selected from a manual transmission mode and an automatic transmission mode.

As shown in FIG. 1, the shift lever apparatus 10 includes a box-shaped housing case 12 to be secured with a bolt or the like to a vehicle body frame at the lower end thereof. A shift lever 14 is arranged at the center portion of the housing case 12. The shift lever 14 includes a round rod-shaped lever rod 16 and a supporting member 18 for covering the lower end portion of the lever rod 16 to support the same. A shift knob, not shown, is fixed to the upper end portion of the lever rod 16.

The supporting member 18 is formed into a rod shape having a square shape in cross-section with resin material, and is formed at the lower end portion thereof with a notch 20 penetrating therethrough in the widthwise direction (direction indicated by an arrow W) at the center portion in terms of the front and rear direction (direction indicated by an arrow FR). A column shaped first spindle 22 arranged in parallel with the widthwise direction, is fitted into the notch 20 and the lower end portion of the supporting member 18 and the first spindle 22 are rotatably connected by a column shaped second spindle 24 arranged along the front and rear direction. The second spindle 24 is locked with a clip 26 which engages the supporting member 18.

The first spindle 22 is inserted through through holes 30 formed respectively on a pair of side walls 28 of the housing case 12, and the both axial ends thereof project outside from the side walls 28 of the housing case 12. A flange-shaped stopper 32 is provided at a projected axial end of the first spindle 22, and is engaged with a hole edge of the through hole 30. The first spindle 22 is provided at the other end in terms of the axial direction thereof with a column shaped engaging portion 34 so as to project in the axial direction. A clip 38 engages the engaging portion 34 via a flat washer 36, which engages the hole edge of the through hole 30. Accordingly, the first spindle 22 is supported by the housing case 12 so as not to be capable of moving in the axial direction but to be capable of rotating about the axial line.

Accordingly, the shift lever 14 can be operated in a shifting direction (front and rear direction, first operating direction in this embodiment) about the axial line of the first spindle 22 and can be operated in a selecting direction orthogonal to the shifting direction about the axial line of the second spindle 24 (widthwise direction, second operating direction in this embodiment).

Figure 4:
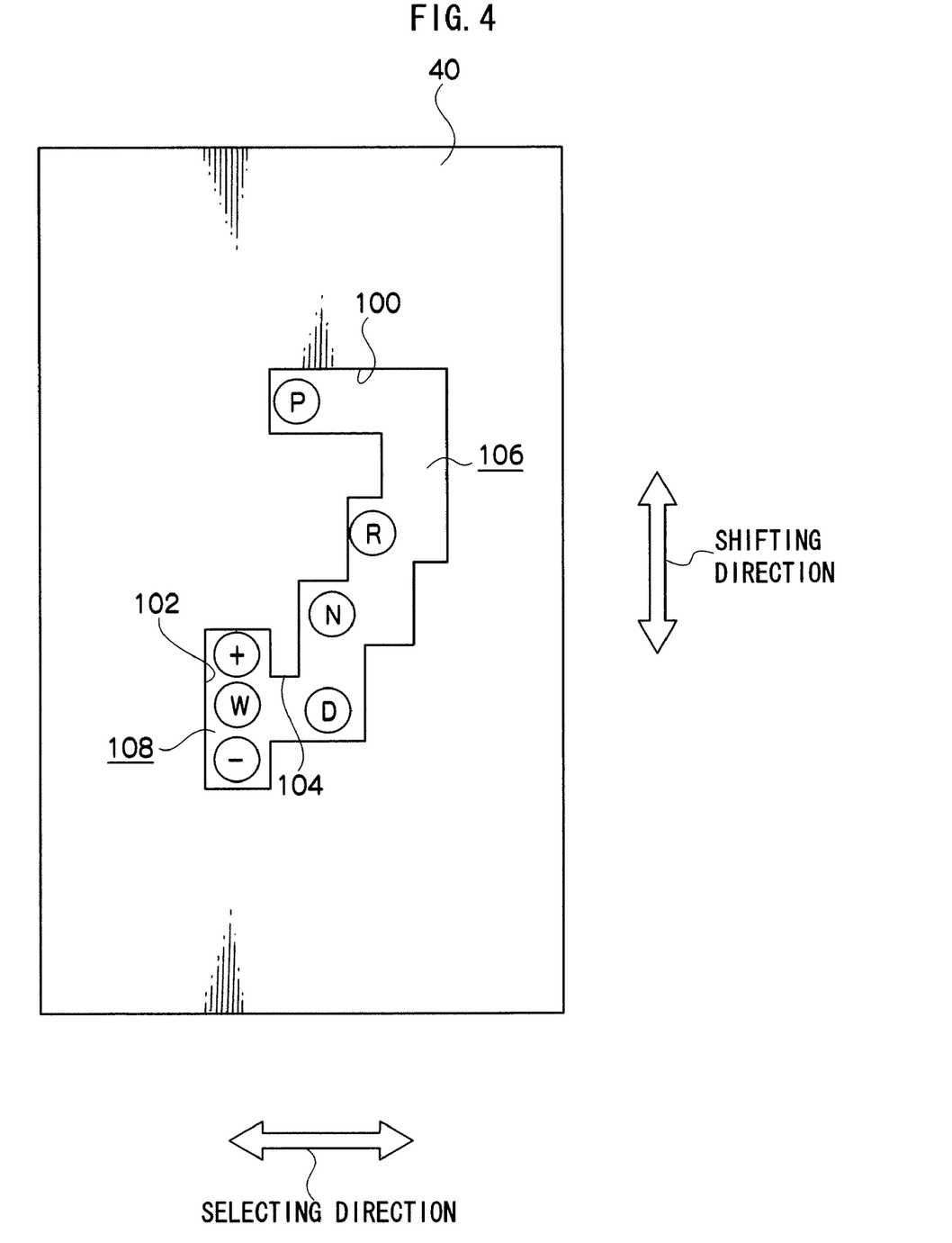
FIG. 4 is a plan view showing a configuration of the front (outer) surface of a lever guide shown in FIG. 1.

The shift lever apparatus 10 is provided with a thick plate-shaped lever guide 40 for closing an opening on top of the housing case 12. As shown in FIG. 4, the lever guide 40 includes a first guide groove 100 extending in a zigzag shape (e.g., stepped shape) along the shifting direction or the selecting direction, and a second guide groove 102 extending along the shifting direction, and a transition guide groove 104 extending along the selecting direction for connecting the first guide groove 100 and the second guide groove 102. Here, the first guide groove 100 constitutes an automatic transmission area 106 as an area for selecting the automatic transmission mode, and the second guide groove 102 constitutes a manual transmission area 108 as an area for selecting the manual transmission mode.

The width of the guide grooves 100, 102 and 104 of the lever guide 40 is slightly wider than the outer diameter of the lever rod 16 of the shift lever 14. As shown in FIG. 1, the lever rod 16 of the shift lever 14 is inserted into the guide grooves 100, 102 and 104. Accordingly, the shift lever 14 is held inside one of the first guide groove 100, the second guide groove 102 and the transition guide groove 104 and is movable along the first guide groove 100, the second guide groove 102 and the transition guide groove 104.

In the shift lever apparatus 10, when the shift lever 14 is shifted in the shifting direction or in the selecting direction along the first guide groove 100 in a state in which the shift lever 14 is positioned in the automatic transmission area 106 (see FIG. 4), the shift lever 14 may be positioned at a given shift position (the parking position (position P), the reverse position (position R), the neutral position (position N) and the drive position (position D) in this embodiment). The position P, the position R, the position N and the position D are set at different positions along the shifting direction as shown in FIG. 2.

As shown in FIG. 1, the shift lever apparatus 10 includes a position P detection switch 44 for detecting that the shift lever 14 is positioned at the position P and a solenoid 46 for locking the shift lever 14 positioned at the position P. In a state in which the position P detection switch 44 detects that the shift lever 14 is positioned at the position P, the shift lever 14 is blocked from being shifted from the position P to the position R by the solenoid 46 unless the brake of the vehicle is operated.

In the shift lever apparatus 10, in a state in which the shift lever 14 in the automatic transmission area 106 is positioned at a specific shift position (position D in this embodiment), the shift lever 14 is moved through the transition guide groove 104 to the second guide groove 102 (the manual transmission area 108) by being shifted in one direction (left side in this embodiment) along the selecting direction (see FIG. 4). In the manual transmission area 108, the shift lever 14 is shiftable to the shift waiting position (position W), an shift-up position (position +) and a shift-down position (position −) along the shifting direction, and the shift lever 14 is urged to the position W set at the center of the second guide groove 102 along the shifting direction.

In the shift lever apparatus 10, when the shift lever 14 at the position W in the manual transmission area 108 is shifted to the position + or the position −, a switch arm 48 projecting downward from the lower end portion of the supporting member 18 activates a control switch 50 fixed to the housing case 12 as shown in FIG. 1. Accordingly, an automatic transmission of the vehicle is shifted in the manual transmission mode.

More specifically, when the shift lever 14 at the position W is shifted to the position +, the automatic transmission is upshifted, and when the shift lever 14 at the position W is shifted to the position −, the automatic transmission is downshifted.

In the shift lever apparatus 10, in a state in which the shift lever 14 in the manual transmission area 108 is positioned at the position W, the shift lever 14 is restored to the first guide groove 100 (automatic transmission area 106) through the transition guide groove 104 by shifting the shift lever 14 in the other direction (rightward in this embodiment) along the selecting direction.

As shown in FIG. 1, a cylindrical holder portion 52 projects obliquely upward at the longitudinal center portion of the supporting member 18. A coil spring 54 is inserted into a cylinder of the holder portion 52, and a column-shaped detent pin 56 is also inserted thereto so as to be movable along the directions of compression and expansion which correspond to the axial direction of the holder portion 52. The coil spring 54 is always in the compressed state by the detent pin 56 in the holder portion 52, and urges the detent pin 56 toward the lever guide 40.

When the detent pin 56 is moved to the direction of compression (toward the first spindle 22), the amount of compression with respect to the coil spring 54 is increased. In contrast when the detent pin 56 is moved in the direction of expansion, the amount of compression with respect to the coil spring 54 is reduced. The detent pin 56 is connected to the shift lever 14 by the holder portion 52 so as to move integrally therewith in the shifting direction and the selecting direction. The detent pin 56 is formed with a semi-spherical portion 57 having a spherical shape at the distal end thereof. The semi-spherical portion 57 is brought into press contact with any one of a first sliding surface 110, a second sliding surface 112 and a transition sliding surface 114 of the lever guide 40, described later.

Figure 5:
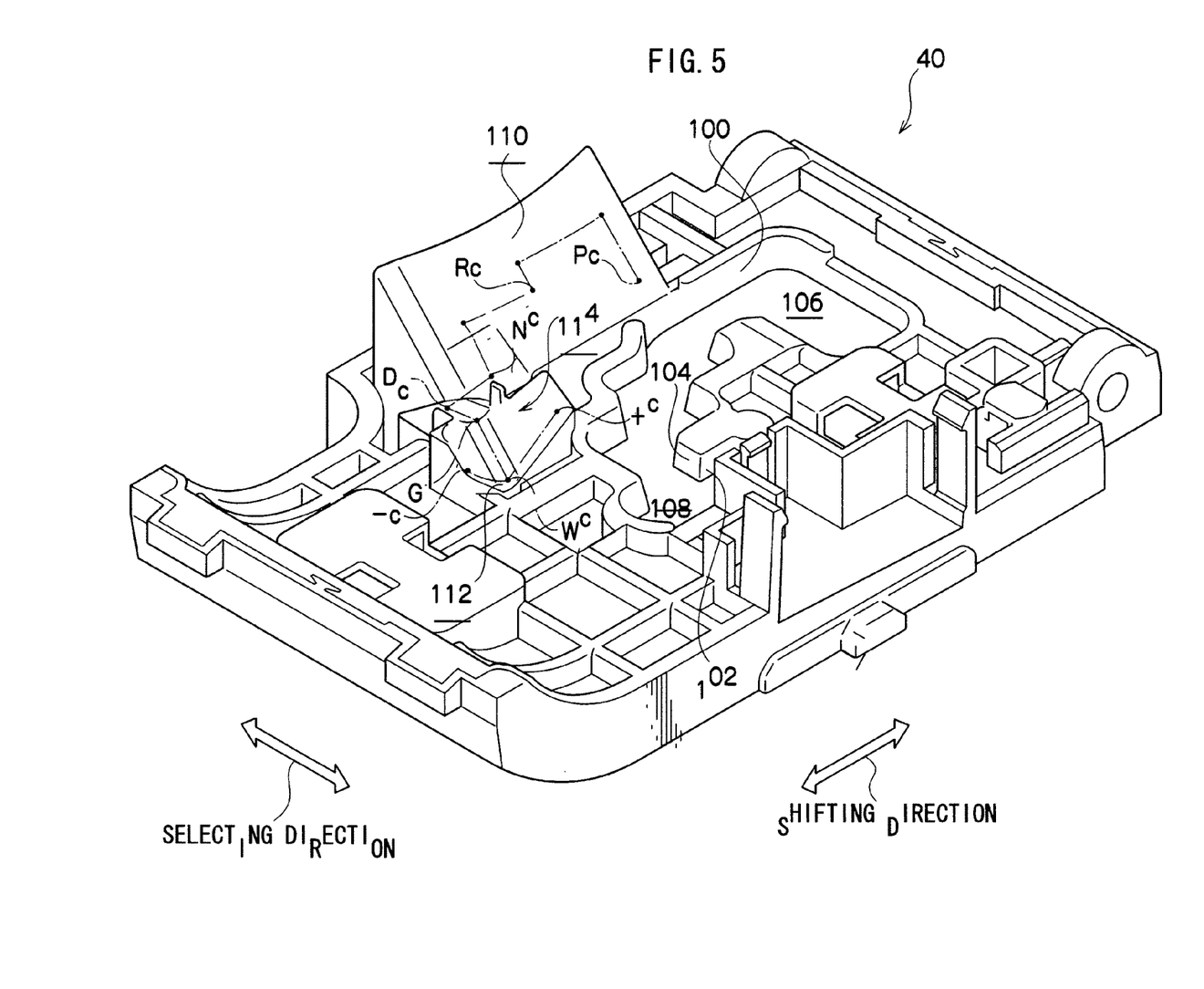
FIG. 5 is a perspective view showing a configuration of the back (rear) surface of the lever guide shown in FIG. 1.

On the other hand, the lever guide 40 is formed on the back surface thereof with the first sliding surface 110, the second sliding surface 112 and the transition sliding surface 114 corresponding respectively to the first guide groove 100, the second guide groove 102 and the transition guide groove 104, as shown in FIG. 5. Here, the semi-spherical portion 57 of the detent pin 56 is brought into press contact with the first sliding surface 110 when the shift lever 14 is held in the first guide groove 100, the semi-spherical portion 57 is brought into press contact with the second sliding surface 112 when the shift lever 14 is held in the second guide groove 102, and the semi-spherical portion 57 is brought into press contact with the transition sliding surface 114 when the shift lever 14 passes through the transition guide groove 104. In this case, the detent pin 56 brings the semi-spherical portion 57 into press contact with the sliding surfaces 110, 112 and 114 substantially at the same load (press contact force) with an urging force of the coil spring 54.

In the shift lever apparatus 10, when the shift lever 14 is moved along the first guide groove 100, the semi-spherical portion 57 of the detent pin 56 slides on the first sliding surface 110 along a trajectory corresponding to the shifted trajectory of the shift lever 14 in the shifting direction or the selecting direction, and when the shift lever 14 is held at a predetermined shift positions (positions P, R, N and D), the semi-spherical portion 57 is positioned at positions (positions Pc, Rc, Nc and Dc) corresponding to the positions P, R, N and D on the first sliding surface 110 (see FIG. 5).

In the shift lever apparatus 10, when the shift lever 14 is moved along the second guide groove 102, the semi-spherical portion 57 of the detent pin 56 slides on the second sliding surface 112 along a trajectory corresponding to the shifted trajectory of the shift lever 14 in the shifting direction, and when the shift lever 14 is shifted from the position W to the shift change position (position + or −), the semi-spherical portion 57 is slid from a position on the second sliding surface 112 corresponding to the position W (position Wc) to the position +c or −c.

In the shift lever apparatus 10, the sliding surfaces 110, 112 and 114 which receive the press contact force from the semi-spherical portion 57 each generate a reaction force in the direction of the normal line, and the reaction force is transmitted to the shift lever 14 via the detent pin 56. At this time, the reaction force generated by the first sliding surface 110 serves as a holding force for holding the shift lever 14 stably at a predetermined shift position when the shift lever 14 reaches the predetermined shift position (positions P, R, N or D) in the automatic transmission area 106, and serves as an urging force (resistance force or driving force) for providing a tactile feedback to an operator of the shift lever 14 when the shift lever 14 is moved between the adjacent shift positions in the automatic transmission area 106.

The reaction force generated by the second sliding surface 112 serves as a holding force for holding the shift lever 14 stably at the position W when the shift lever 14 is at the position W in the manual transmission area 108, and serves as an urging force (restoration force) for restoring the shift lever 14 to the position W after having shifted the shift lever 14 from the position W to the shift change position (position + or −).

The reaction force generated by the transition sliding surface 114 serves as an urging force for providing the tactile feedback to the shift lever 14 when the shift lever 14 passes through the transition guide groove 104, that is, between the first guide groove 100 and the second guide groove 102.

Figure 6:
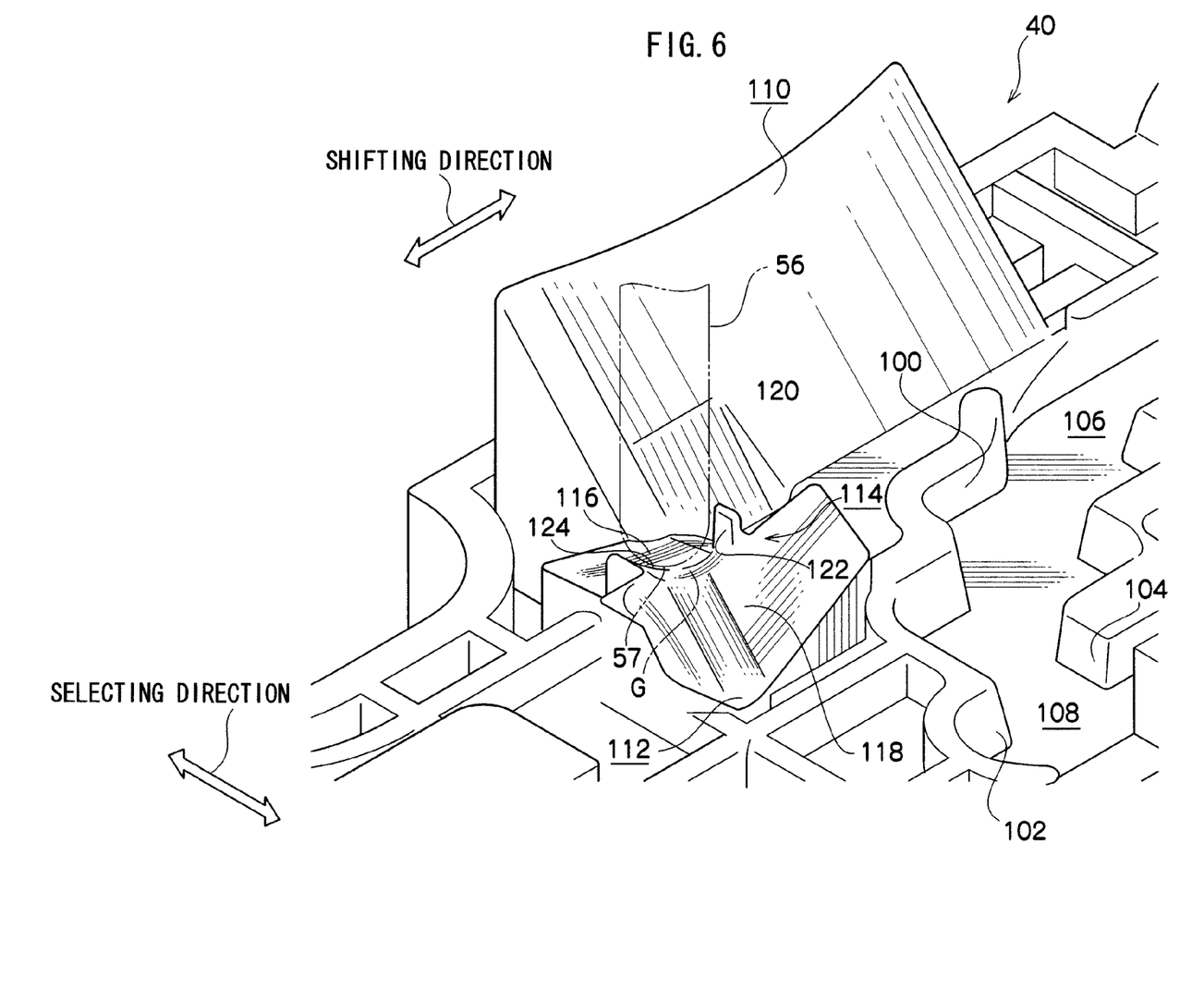
FIG. 6 is a perspective view showing a configuration of a first sliding surface, a second sliding surface and a transition sliding surface according to the embodiment of the invention.
Figure 7:
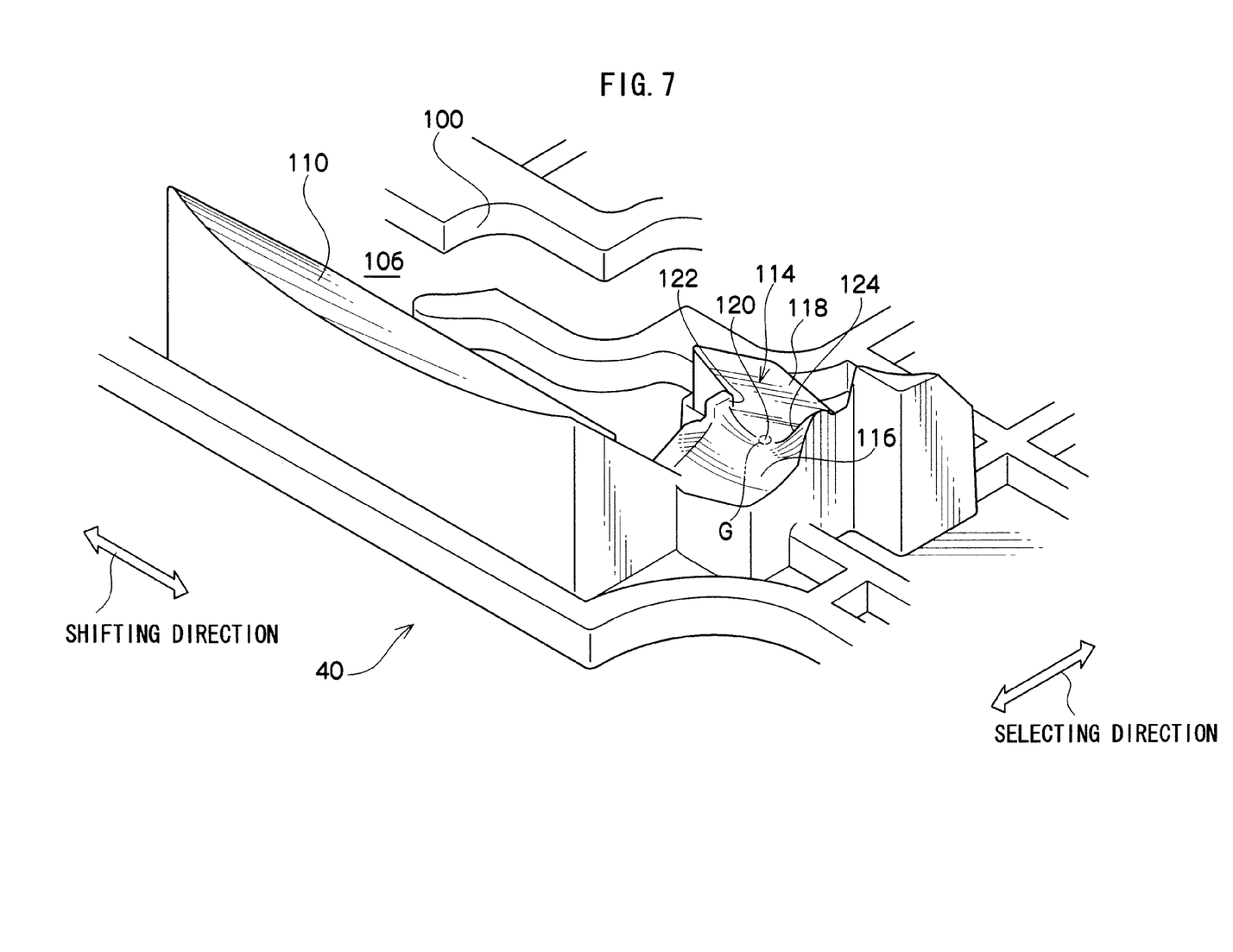
FIG. 7 is a perspective view showing configurations of the first sliding surface, the second sliding surface and the transition sliding surface according to the embodiment of the invention.

As shown in FIG. 6 and FIG. 7, the transition sliding surface 114 is formed with an inclined surface 116 having upward inclination from the position Dc to the position Wc, an inclined surface 118 formed continuously from the inclined surface 116 and having downward inclination, and an apex 120 partitioning between the inclined surfaces 116 and 118 along the selecting direction.

When the shift lever 14 is shifted from the position D in the automatic transmission area 106 to the position W in the manual transmission area 108, the detent pin 56 moving integrally with the shift lever 14 moves from the position Dc in the first sliding surface 110 to the position Wc in the second sliding surface 112 through the transition sliding surface 114.

When the detent pin 56 passes through the transition sliding surface 114, the detent pin 56 firstly increases the amount of compression of the coil spring 54 gradually while being pressed downward along the inclined surface 116 in the direction of compression in association with the movement toward the position Wc along the selecting direction. During this operation, the inclined surface 116 converts the urging force from the coil spring 54 into an urging force (resistance force) in the direction opposing the direction of movement of the detent pin 56, and the resistance force is transmitted to the shift lever 14 through the detent pin 56. This resistance force reaches substantially the maximum value immediately before the detent pin 56 reaches the apex 120 along the selecting direction.

The detent pin 56 having reached the apex 120 gradually reduces the amount of compression of the coil spring 54 while moving along the direction of expansion (upward) along the inclined surface 118 by the urging force of the coil spring 54 in association with the movement to the position Wc along the selecting direction. In this case, the inclined surface 118 converts the urging force from the coil spring 54 into an urging force (driving force) for pressing forward the detent pin 56 in the direction of movement, and transmits the driving force to the shift lever 14 via the detent pin 56. When the detent pin 56 reaches the lower end portion (the position Wc) of the inclined surface 118 along the selecting direction and the shift lever 14 comes into abutment with the inner wall surface of the second guide groove 102 so that the movement of the detent pin 56 is blocked together with the shift lever 14, the driving force works on the shift lever 14 as a holding force for holding the detent pin 56 at the position Wc. Accordingly, the tactile feedback is provided to the driver when the driver moves the shift lever 14 from the position Dc to the position Wc.

In contrast to the case shown above, in a case in which the shift lever 14 is shifted from the position W in the manual transmission area 108 to the position D in the automatic transmission area 106, the inclined surface 118 transmits the resistance force to the shift lever 14 via the detent pin 56 when the detent pin 56 is moved from the position Wc to the position Dc, then, the inclined surface 116 transmits the driving force to the shift lever 14 via the detent pin 56 when the detent pin 56 having reached the apex 120 is moved further toward the position Dc. When the detent pin 56 reaches the position Dc, the driving force serves as a holding force for holding the detent pin 56 at the position Dc. Accordingly, the tactile feedback is provided to the driver when the shift lever 14 is moved from the position Wc to the position Dc.

As shown in FIG. 7, the transition sliding surface 114 is formed with a gate portion 122 and a gate portion 124 having a convex shape so as to project along the shifting direction with the apex 120 interposed therebetween. A pair of the gate portions 122 and 124 project respectively upward with respect to the apex 120, are inclined smoothly from the outsides in terms of the shifting direction toward the apex 120, and are joined at the lower ends thereof at the apex 120. When the pair of gate portions 122 and 124 and the apex 120 are viewed in the selecting direction, the gate portions 122 124 and the apex 120 define a substantially U-shaped (depressed) groove, and the radius of curvature of the bottom portion of this groove is substantially equivalent to, or slightly larger than, the radius of curvature of the semi-spherical portion 57 of the shift lever 14.

Figure 8:
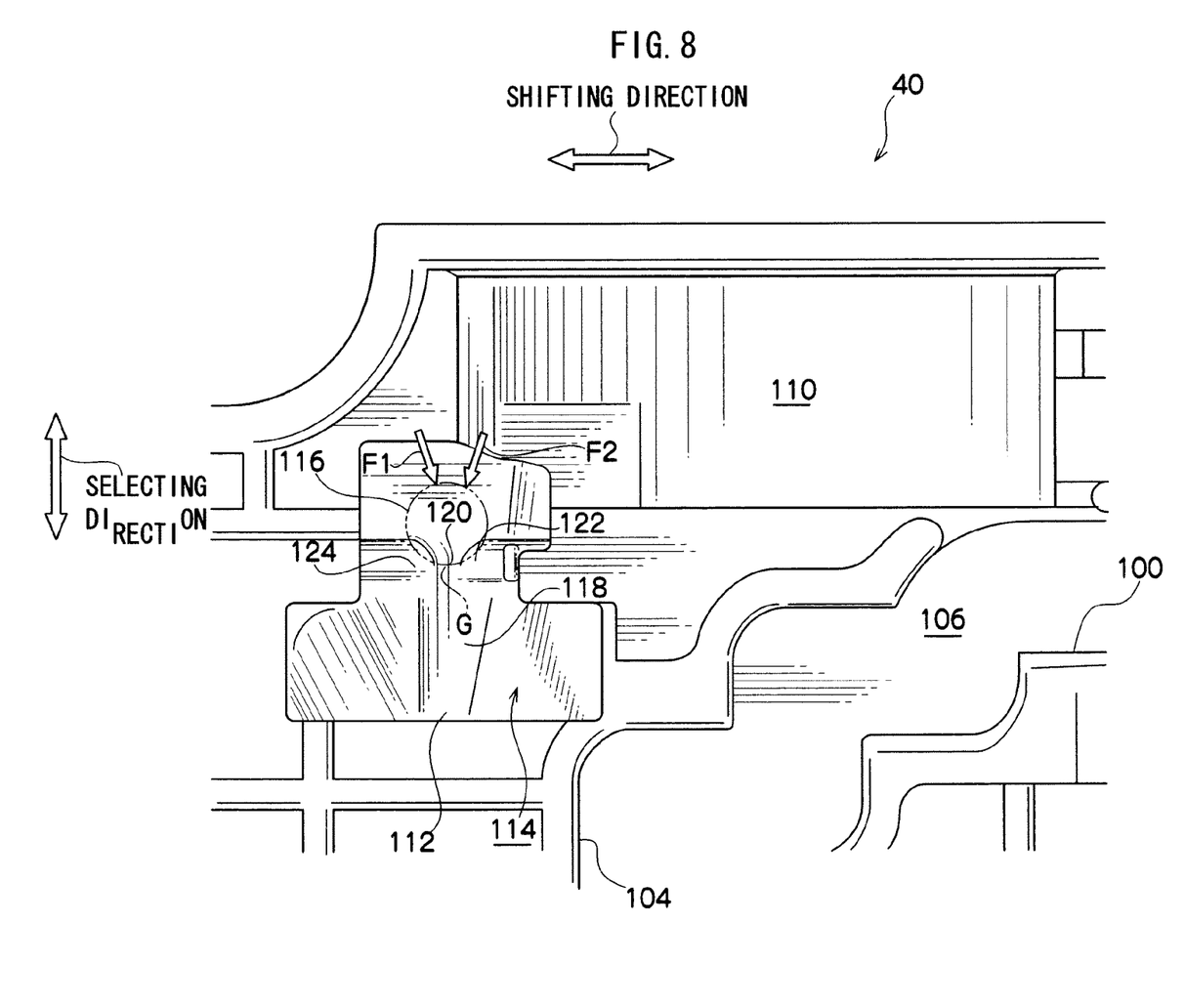
FIG. 8 is a plan view showing configurations of the first sliding surface, the second sliding surface and the transition sliding surface according to the embodiment of the invention.
Figure 9:
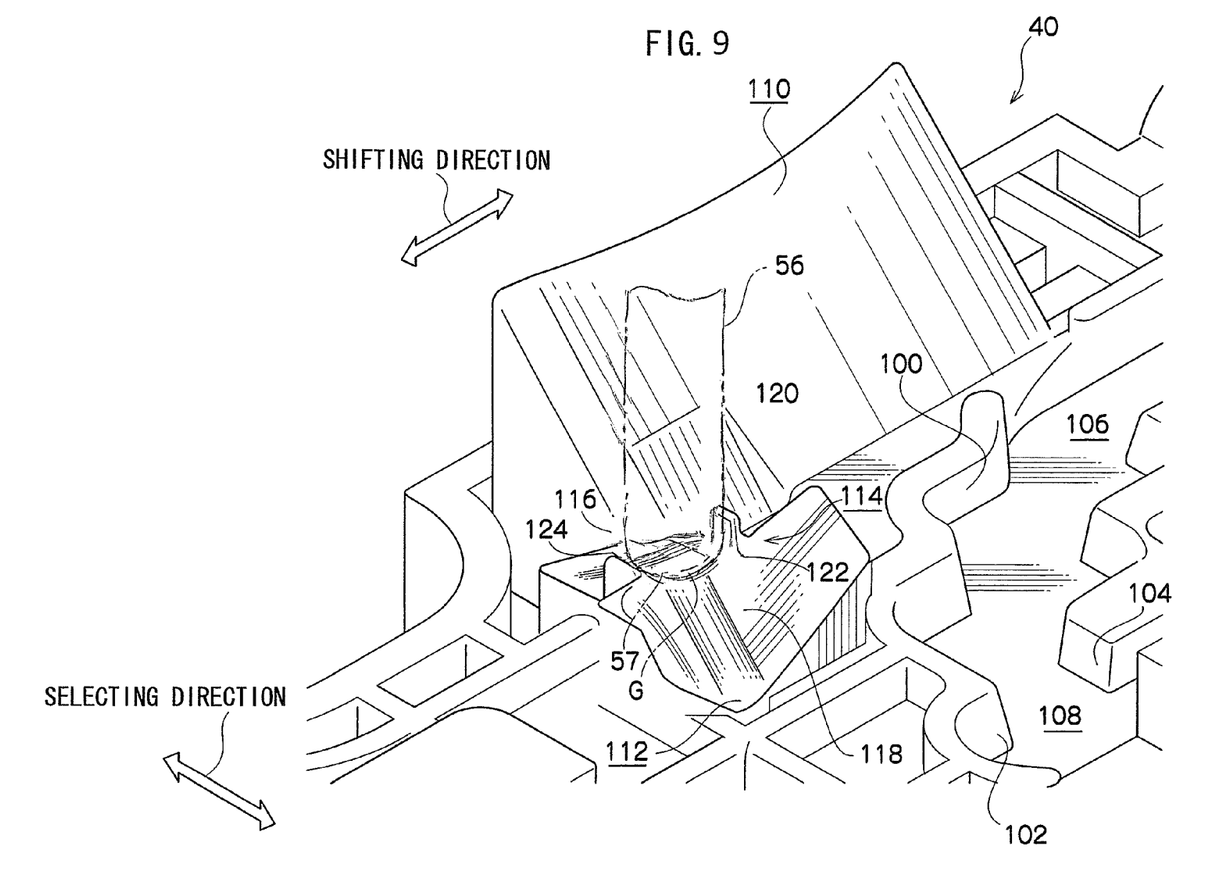
FIG. 9 is a perspective view showing how the detent pin engages both the apex and the pair of gate portions formed on the first sliding surface at the same time.

The pair of gate portions 122 and 124 come into contact with the semi-spherical portion 57 of the shift lever 14 together with the apex 120 when the detent pin 56 is moved on the transition sliding surface 114 from the position Dc to the position Wc as shown in FIG. 9, and from the position Wc to the position Dc as shown in FIG. 6, and practically limits the movable direction of the detent pin 56 only to the selecting direction. In other words, the shift lever 14 is movable only along the selecting direction on the transition sliding surface 114 in the vicinity of the apex 120. In contrast, when an operation force F1 or F2 in the direction inclined with respect to the selecting direction is applied to the shift lever 14 before the gate portions 122 and 124 as shown in FIG. 8, the movement of the shift lever 14 toward the position W is blocked by the gate portions 122 and 124, or the movement of the shift lever 14 is redirected by the gate portions 122 and 124 to the movement along the selecting direction.

As shown in FIG. 6 and FIG. 7, when the semi-spherical portion 57 of the shift lever 14 is moved to the position near the apex 120, the pair of gate portions 122 and 124 come into contact respectively with the both ends of the semi-spherical portion 57 in terms of the shifting direction. Accordingly, the area where the detent pin 56 can pass through along the shifting direction is limited to a gate area G having a width narrower than the width of the transition sliding surface 114. The width of the gate area G in terms of the shifting direction is set to be smaller than rattling generally allowed to the shift lever 14 by itself. Therefore, passage of the shift lever 14 through the position corresponding to the gate area G is blocked by the gate portions 122 and 124 unless the driver moves the shift lever 14 along the direction corresponding to the selecting direction in an area between the gate portions 122 and 124, and positions the shift lever 14 at a position corresponding to the gate area G along the selecting direction.

However, even though the position of the shift lever 14 in terms of the shifting direction is deviated from the position corresponding to the gate area G immediately before the gate portions 122 and 124, the shift lever 14 can pass through the position corresponding to the gate area G by the semi-spherical portion 57 being guided toward the gate area G by the reaction force from the gate portions 122 and 124 formed into smooth curved surface.

As shown in FIG. 1 and FIG. 3, a projection 58 formed into a block shape which is square in cross section is provided on the supporting member 18 at the longitudinal midsection thereof so as to project from one side in terms of the widthwise direction (the left side in this embodiment). The projection 58 corresponds to a hole 62 of a control lever 60, described later.

The supporting member 18 is formed with an engaging projection 64A which constitutes a clutch mechanism on one side thereof in terms of the widthwise direction (the right side in this embodiment). The engaging projection 64A is positioned at a higher level than the projection 58 and has a substantially square shape in cross section taken along the front and rear direction. The engaging projection 64A corresponds to a lever portion 66 of the control lever 60 which constitutes the clutch mechanism, described later.

The control lever 60 is formed by integral molding with resin material or by bending a metal plate. As shown in FIG. 1, the control lever 60 is provided with a first bearing 72 on one side in terms of the direction of the axis of the first spindle 22 (the left side in this embodiment) and a second bearing 74 on the other side in terms of the direction of the axis of the first spindle 22 (the right side in this embodiment). The lower ends of the first bearing 72 and the second bearing 74 are arranged in the direction of the axis of the first spindle 22 and are connected integrally by a connecting portion 76 continuously extending between the first bearing 72 and the second bearing 74.

Center portions of the first bearing 72 and the second bearing 74 are formed respectively with a first insertion hole 78 and a second insertion hole 80, and the first spindle 22 is inserted into the first insertion hole 78 and the second insertion hole 80 via bushings 82. Accordingly, the control lever 60 is rotatably supported about the axial center of the first spindle 22.

The control lever 60 is integrally provided with a cable mount 84 on the front side of the first bearing 72. The distal end portion of the cable mount 84 is provided with a column shaped cable pin 86 so as to project from the surface extending on one side in terms of the direction of the axis of the first spindle 22 (the left side in this embodiment). An end of a control cable is fitted at the cable pin 86, and the automatic transmission of the vehicle is connected thereto via the control cable.

The control lever 60 is provided with a square hole 62 on the first bearing 72 at a position corresponding to the projection 58 of the shift lever 14 immediately above the first insertion hole 78. The projection 58 is inserted into the hole 62 when the shift lever 14 is shifted from the automatic transmission area 106 to the manual transmission area 108 (see FIG. 3). The dimension of the hole 62 in terms of the shifting direction is set to be longer than the shifting range of the projection 58 in association with the movement of the shift lever 14 along the shifting direction in the manual transmission area 108.

The control lever 60 is integrally formed with the lever portion 66 which constitutes the clutch mechanism on the upper side of the second bearing 74. The lever portion 66 is formed substantially into an L-shape in front view, and is integrally formed with an engaging portion 90 of substantially a plate shape extending toward the front side of the vehicle at the upper end thereof. The engaging portion 90 is formed with a square engaging hole 92 at the center thereof, so that the engaging projection 64A of the shift lever 14 can be inserted into and removed from the engaging hole 92.

More specifically, as shown in FIG. 3, in a state in which the shift lever 14 is positioned in the automatic transmission area 106 (see FIG. 4), the engaging projection 64A is inserted into the engaging hole 92. Accordingly, the shift lever 14 is connected to the control lever 60 via the engaging projection 64A and the engaging hole 92 of the lever portion 66, and the shift lever 14 and the control lever 60 rotate integrally about the axial center of the first spindle 22. In a state in which the shift lever 14 is positioned in the manual transmission area 108 (see FIG. 4), the engaging projection 64A is separated from the engaging hole 92. Accordingly, the connected state between the shift lever 14 and the control lever 60 is released, and hence the shift lever 14 is rotatable about the axial center of the first spindle 22 independently from the control lever 60.

Therefore, in the shift lever apparatus 10, when the shift lever 14 is operated in the shifting direction in the state of being positioned in the automatic transmission area 106 (see FIG. 4), the control lever 60 is rotated about the axial center of the first spindle 22 via the engaging projection 64A of the shift lever 14 and the engaging hole 92 of the control lever 60. Accordingly, the automatic transmission is shifted via the control cable fitted at one end to the cable pin 86 of the cable mount 84 of the control lever 60. In other words, a plurality of automatic transmission modes set to the automatic transmission are selected in association with the movement of the shift lever 14 to the predetermined shift position (any one of the position P, the position R, the position N and the position D in this embodiment).

In the shift lever apparatus 10, when the shift lever 14 is shifted from the lever portion 66 side of the control lever 60 along the selecting direction in a state of being positioned at the position D, and is moved to the manual transmission area 108, the shift lever 14 positioned at the position W can be shifted to the position + or the position − along the shifting direction while holding the control lever 60 in the position D. In the shift lever apparatus 10, when the shift lever 14 is shifted to the position + or the position − along the shifting direction, the control switch 50 is activated and the automatic transmission is upshifted or downshifted in the manual transmission mode.

In the state in which the shift lever 14 is positioned in the manual transmission area 108, the projection 58 of the shift lever 14 is inserted into the hole 62 of the control lever 60. However, as described above, since the dimension of the hole 62 in terms of the shifting direction is set to be longer than the range of movement of the projection 58 in association with the movement of the shift lever 14 in the manual transmission area 108 in the shifting direction, the shift lever 14 is not interlocked with the control lever 60 by the engagement between the projection 58 and the hole 62. On the other hand, when the control lever 60 is rotated independently of the shift lever 14 improperly in this state, the projection 58 comes into abutment with the inner peripheral edge of the hole 62, so that the improper rotation of the control lever 60 is blocked.

Operation of the Embodiment

Subsequently, the operation of the shift lever apparatus 10 according to the embodiment configured as described above will be described.

In the shift lever apparatus 10, when the shift lever 14 is operated in the shifting direction to select the shift position in the state of being positioned in the automatic transmission area 106, the control lever 60 is rotated in the direction of axial line of the first spindle 22 via the engaging projection 64A of the shift lever 14 and the engaging hole 92 of the control lever 60. Consequently, the automatic transmission is shifted via the control cable which is fitted at one end to the cable pin 86 of the cable mount 84 of the control lever 60.

When the shift lever 14 is shifted toward the position W in the selecting direction in the state of being positioned at the position D and is moved to the manual transmission area 108, the engaging projection 64A of the shift lever 14 is separated from the engaging hole 92, and hence the shifting operation independently of the control lever 60 of the shift lever 14 is enabled (the connection between the shift lever 14 and the control lever 60 is released). When the shift lever 14 is shifted to the position + or the position − in this state, the automatic transmission is shifted in the manual transmission mode.

In the shift lever apparatus 10 described thus far, the pair of gate portions 122, 124 formed near the apex of the transition sliding surface 114 come into contact with the semi-spherical portion 57 of the detent pin 56 which slides on the transition sliding surface 114 to limit the shifting direction of the detent pin 56 to the direction which practically corresponds to the selecting direction. Therefore, when the shift lever 14 which is moved in the shifting direction and the selecting direction integrally with the detent pin 56 passes through the transition guide groove 104, even though the operating force including a component inclined in the shifting direction with respect to the selecting direction (load component) is applied to the shift lever 14, passage of the shift lever 14 between the gate portions 122 and 124 is prevented by the reaction force transmitted from the pair of gate portions 122 and 124 via the detent pin 56 and hence the direction of movement of the shift lever 14 is limited only to the direction practically matching the selecting direction.

Consequently, according to the shift lever apparatus 10, passage of the shift lever 14 to which the operating force including the load component in the oblique direction with respect to the selecting direction is transmitted in the transition guide groove 104 is prevented, and only the shift lever 14 to which the operating force including the load component substantially in parallel with the selecting direction is transmitted is allowed to pass in the transition guide groove 104 smoothly. Therefore, for example, even though the shift lever 14 is shifted in the oblique direction in the first guide groove 100 which extends in a zigzag pattern, erroneous entry of the shift lever 14 into the second guide groove 102 from the first guide groove 100 through the transition guide groove 104 can be effectively prevented.

In the shift lever apparatus 10, the area on the transition sliding surface 114 extending along the shifting direction, which corresponds to the area where the detent pin 56 can pass through, is limited to the gate area G having a predetermined width narrower than the width of the transition sliding surface 114 by the pair of gate portions 122, 124, and hence the area though which the shift lever 14 can pass along the shifting direction in the transition guide groove 104 is limited to the area corresponding to the gate area G. Therefore, the detent pin 56 is caught by the gate portion 122 or the gate portion 124 and hence the shift lever 14 cannot pass through the transition guide groove 104 unless the shift lever 14 in the first guide groove 100 is reliably positioned (stopped) at a predetermined position corresponding to the gate area G in the shifting direction (the position corresponds to the position D in this embodiment) and then the shift lever 14 is entered into the transition guide groove 104.

Consequently, according to the shift lever apparatus 10, the movement of the shift lever 14 toward the position W is blocked by the gate portions 122 and 124 unless the shift lever 14 is positioned once at the position D which corresponds to the gate area G in the first guide groove 100, and then is shifted toward the position W along the direction practically matching the selecting direction. Therefore, erroneous entry of the shift lever 14 into the second guide groove 102 through the transition guide groove 104 can be prevented without being stopped once at the position D is prevented when the shift lever 14 is shifted in the oblique direction in the first guide groove 100.

According to the shift lever apparatus 10, when an attempt is made to shift the shift lever 14 at the position W in the manual transmission area 108 to the position D in the automatic transmission area 106 as well, the direction that the shift lever 14 is allowed to move is limited to the selecting direction by the gate portions 122 and 124, and the area where the shift lever 14 is allowed to pass through along the shifting direction is limited to the gate area G. Therefore, the shift lever 14 is reliably stopped at the position D after having passed through the transition guide groove 104 and erroneous movement of the shift lever 14 to the position N or the position R in the automatic transmission area 106 is effectively prevented.

According to the shift lever apparatus 10 in the embodiment, the pair of gate portions 122 and 124 are formed only in the vicinity of the apex 120 on the transition sliding surface 114, and the dimension in the selecting direction thereof is short. However, the pair of gate portions as such may be formed continuously in an area extending across the portions of the transition sliding surface 114 in the vicinity of the inclined surface 116 and the apex 120, or may be formed continuously in areas extending across the inclined surface 116, the apex 120 and the inclined surface 118.

In the shift lever apparatus 10, the first sliding surface 110, the second sliding surface 112 and the transition sliding surface 114 are provided respectively on the back side of the lever guide 40. However, the guide grooves 100, 102 and 104 may be provided at portions different from the lever guide 40. More specifically, a configuration such that the guide grooves 100, 102 and 104 are provided on the bottom surface in the housing case 12 and the holder portion 52 is formed so as to project obliquely downwardly of the supporting member 18 so that the distal end of the detent pin 56 movably supported by the holder portion 52 are brought into press contact with the guide grooves 100, 102 and 104 provided on the bottom surface in the housing case 12 is also applicable.

What is claimed is:

1. A shift lever apparatus comprising:
a shift lever movable along a first operating direction and a second operating direction substantially orthogonal to each other;
a lever guide having a first guide groove extending in a zigzag pattern along the first operating direction or the second operating direction, a second guide groove extending along the first operating direction, and a transition guide groove extending in the second operating direction and connecting the first guide groove and the second guide groove, the lever guide holding the shift lever within any one of the first guide groove, the second guide groove and the transition guide groove and guiding the shift lever along the first guide groove, the second guide groove and the transition guide groove;

a detent pin supported by the shift lever such that the distal end thereof is movable along the direction of coming into and out of contact with the shift lever and such that the detent pin is moved along the first operating direction and the second operating direction integrally with the shift lever;

an urging member for urging the detent pin away from the shift lever;

a first sliding surface for generating a holding force for holding the shift lever at a predetermined shift position in the first guide groove by coming into press contact with the distal end portion of the detent pin when the shift lever is held in the first guide groove;

a second sliding surface for generating a holding force for holding the shift lever at a predetermined shift waiting position in the second guide groove by coming into press contact with the distal end portion of the detent pin when the shift lever is held in the second guide groove;

a transition sliding surface having an apex for generating an urging force for providing a tactile feedback to the shift lever by coming into press contact with the distal end portion of the detent pin when the shift lever passes through the transition guide groove; and a pair of gate portions formed on the transition sliding surface and limiting the direction of movement of the detent pin to a direction substantially matching the second operating direction by coming into contact with the detent pin moving on the transition sliding surface wherein the pair of gate portions come into contact with the detent pin of the shift lever together with the apex of the transition sliding surface when the detent pin is moved on the transition sliding surface.

2. The shift lever apparatus according to claim 1, wherein the pair of gate portions limit an area where the detent pin can pass through along the first operating direction to a gate area having a predetermined width narrower than the width of the transition sliding surface.

3. The shift lever apparatus according to claim 1, wherein the pair of gate portions is formed so as to project from the transition sliding surface, and are arranged along the first operating direction.

4. The shift lever apparatus according to claim 1, wherein the shift lever in the first guide groove is movable to a given shift position in an automatic transmission mode selecting area.

5. The shift lever apparatus according to claim 1, wherein the shift lever in the second guide groove is movable from the shift waiting position to a shift-up position and a shift-down position in a manual transmission mode selecting area.

6. The shift lever apparatus according to claim 1, wherein the transition sliding surface is formed at the back surface side of the lever guide.

7. A shift lever apparatus comprising:

a shift lever movable along a first operating direction and a second operating direction substantially orthogonal to each other;

a lever guide having a first guide groove extending along the first operating direction, a second guide groove extending along the first operating direction, and a transition guide groove extending along the second operating direction and connecting the first guide groove and the second guide groove, the lever guide holding the shift lever within any one of the first guide groove, the second guide groove or the transition guide groove and guiding the shift lever along the first guide groove, the second guide groove and the transition guide groove;

a detent pin including a distal end portion, the detent pin being mounted to the shift lever such that the distal end portion thereof is movable in the direction of coming into and out of contact with the shift lever and the detent pin being moved together with the shift lever;

a transition sliding surface having an apex for generating an urging force for providing a tactile feedback to the shift lever by coming into press contact with the distal end portion of the detent pin when the shift lever passes through the transition guide groove; and a pair of gate portions formed on the transition sliding surface and limiting the direction of movement of the detent pin to a direction substantially matching the second operating direction by coming into contact with the detent pin moving on the transition sliding surface wherein the pair of gate portions come into contact with the detent pin of the shift lever together with the apex of the transition sliding surface when the detent pin is moved on the transition sliding surface.

8. The shift lever apparatus according to claim 7, comprising an urging member for urging the detent pin in the direction away from the shift lever.

9. The shift lever apparatus according to claim 7, wherein the pair of gate portions limit an area where the detent pin can pass through along the first operating direction to a gate area having a predetermined width narrower than the width of the transition sliding surface.

10. The shift lever apparatus according to claim 7, wherein the pair of gate portions are formed so as to project from the transition sliding surface, and are arranged along the first operating direction.

11. The shift lever apparatus according to claim 7, wherein the transition sliding surface is formed at the back surface side of the lever guide.

12. The shift lever apparatus according to claim 7, wherein the transition sliding surface has a curved surface configured with the pair of gate portions with the apex interposed therebetween.

* * * * *